United States Patent [19]

Iaccino

[11] 4,094,052

[45] June 13, 1978

[54] LOCK REMOVAL TOOL

[75] Inventor: George V. Iaccino, New Rochelle, N.Y.

[73] Assignee: Lock Technology, Inc., New Rochelle, N.Y.

[21] Appl. No.: 800,319

[22] Filed: May 25, 1977

[51] Int. Cl.² .................................. B23P 19/04
[52] U.S. Cl. .......................................... 29/263
[58] Field of Search ........................... 29/259–263, 29/265

[56] References Cited

U.S. PATENT DOCUMENTS

| 3,144,342 | 5/1964 | Ridings | 29/265 |
| 3,401,445 | 9/1968 | Fritch | 29/261 |
| 3,972,103 | 8/1976 | Kenyon | 29/263 |
| 4,021,903 | 5/1977 | Walsh | 29/263 |

Primary Examiner—James L. Jones, Jr.
Attorney, Agent, or Firm—Hubbell, Cohen, Stiefel & Gross

[57] ABSTRACT

A handy tool is disclosed which forcibly withdraws a lock cylinder out from its housing by using means which engages underneath an outside flange on the lock cylinder and exerts a pulling force thereon.

9 Claims, 11 Drawing Figures

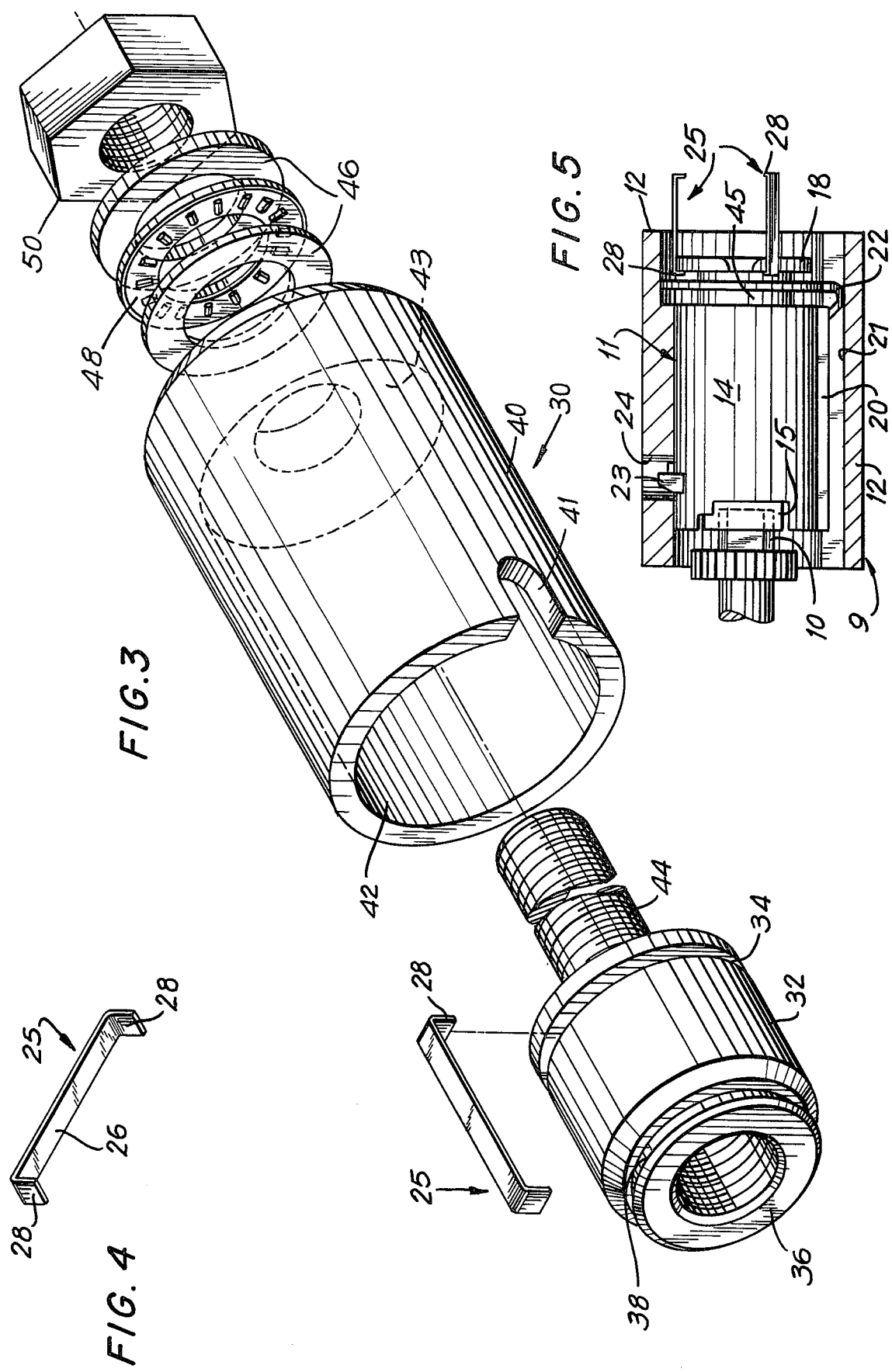

LOCK REMOVAL TOOL

BACKGROUND OF THE INVENTION

1. Field of the Invention

This invention relates to tools for removing key operated lock cylinders, and specifically for removing lock cylinders which are located in the steering columns of automobiles and similar vehicles.

2. Description of the Prior Art

U.S. Pat. No. 3,972,103, issued Aug. 3, 1976, to David L. Kenyon discloses an automobile lock removal tool operative to remove a lock cylinder from within its housing by exerting a pulling force about the outer flange of the cylinder. Such force is communicated to the cylinder by means of a collet which grips the outer shoulder of the lock cylinder. An outer shell fits over the collet and abuts against the lock housing on the steering column of the automobile. The collet is drawn into the shell by turning a bolt which is inserted through the rear of the shell and threaded into the collet. The force thus applied to the cylinder acts to break the outer surface of the cylinder behind a retaining pin so that the cylinder can be easily removed from the housing.

The tool disclosed in U.S. Pat. No. 3,972,103 is suitable only for use in conjunction with lock cylinders mounted on steering wheel columns of General Motors automobiles manufactured from around 1968 to 1976. This is so because the collet disclosed in the patent requires that a predetermined minimal clearance exist between the outside edge of the cylinder plug flange and the portion of the housing which extends outwardly thereabout. In the 1977 model year of General Motors automobiles, this clearance has been substantially reduced in that the overall diameter of the outside cylinder flange has been increased. This alteration prevents the use of the Kenyon or similar tool which may be easily worked in and behind the plug flange to apply an outward force sufficient to break the entire cylinder out from the housing. Thus, in order to remove the lock assembly from the newer line of General Motors automobiles, it becomes necessary to remove the steering wheel and disassemble the steering column in order to free the cylinder retaining pin. As explained in the Kenyon patent, such an operation involves a complicated procedure and leads to considerable expenditures in time and money.

SUMMARY OF THE INVENTION

The present invention provides a tool which, like that disclosed in U.S. Pat. No. 3,972,103, acts to remove from a General Motors car a lock cylinder from its housing without necessitating the removal of the automobile steering wheel, and which may be used in conjunction with both of the new and the older types of lock assemblies used in G.M. cars as described above.

Such advantages are attained by providing a lock removal tool having a cylindrical inner member with first and second longitudinal portions, each having first and second overall diameters and first and second grooves cut thereon, respectively. The two overall diameters correspond, respectively, to the two different overall diameters of the cylinder outer flange which, as explained above, may be encountered. A hollow outer shell is provided and formed so that it may be drawn over the inner member after the member is joined with the lock cylinder by suitable coupling means. The coupling means is so shaped at its ends that it may engage either one of the first and second circumferential grooves on the inner member, and the underside of the flange, respectively.

The above and other advantages of the present invention will become apparent upon a reading of the following disclosure and the figures of the accompanying drawing wherein:

BRIEF DESCRIPTION OF THE DRAWINGS

FIG. 3 is a detailed perspective view of the present invention including means suitable for coupling with the lock cylinder flange shown in FIG. 2;

FIG. 4 illustrates in detail the coupling means shown in FIG. 3;

FIG. 5 is a side view, partly in section, of the lock cylinder shown in FIG. 3 engaged with the coupling means of FIG. 4;

DETAILED DESCRIPTION OF THE INVENTION

Figure 1:
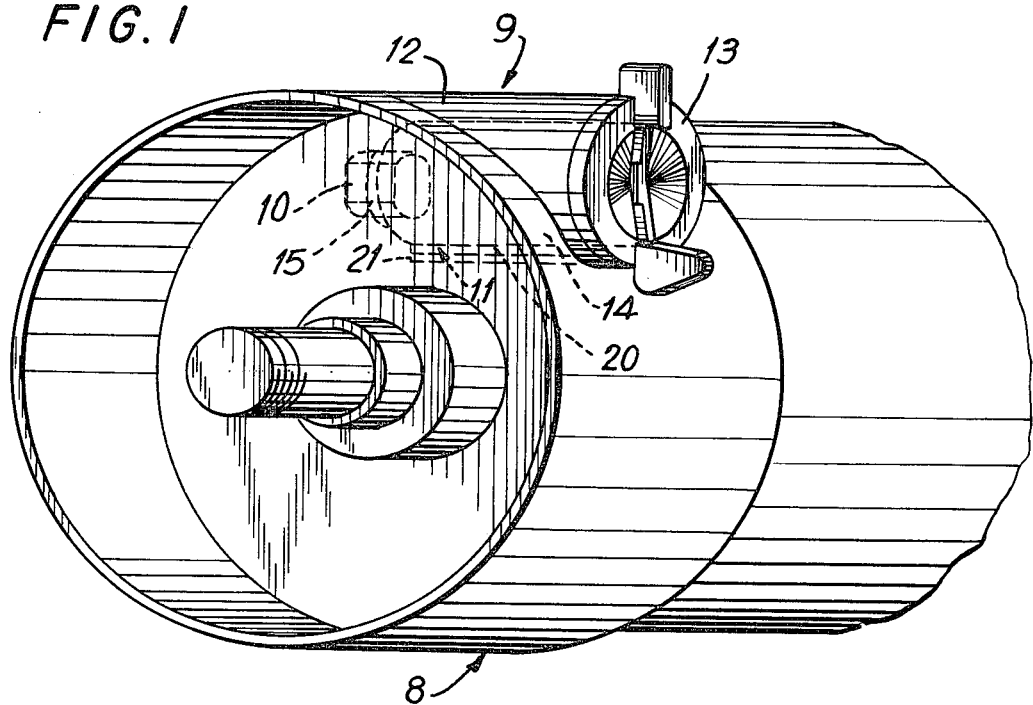
FIG. 1 is a perspective view of a conventional ignition lock assembly mounted on a steering column of a 1977 model General Motors car.

Referring to FIG. 1, a conventional General Motors steering column 8 is shown having a lock assembly 9 of the type which lies transverse to the steering column and operates both to lock the column and to disable the ignition system of the automobile. The lock assembly 9 includes a connecting member 10, a lock cylinder 11, a housing 12 and a cap 13 which is affixed to the outer flange of the cylinder 11 in a manner as shown in FIG. 2.

The connecting member 10 is coupled to the steering wheel locking mechanism and to the ignition system, both of which are conventional and are thus not shown in the drawing. However, it will be understood that when the member 10 which is joined with the lock cylinder is caused to rotate thereby, the steering column unlocks and the ignition system is enabled.

The housing 12 is formed as a portion of the steering column 8. The lock cylinder 11 has an outer portion or shell 14 which remains stationary within the housing 12 and which protects the inner rotatable member or plug of the cylinder. The connecting member 10 engages with the tail end 15 of the inner member of the lock cylinder 11. The actual lock mechanism may be of any well known conventional construction and forms no part of this invention. It is therefore neither shown nor described.

Figure 2:
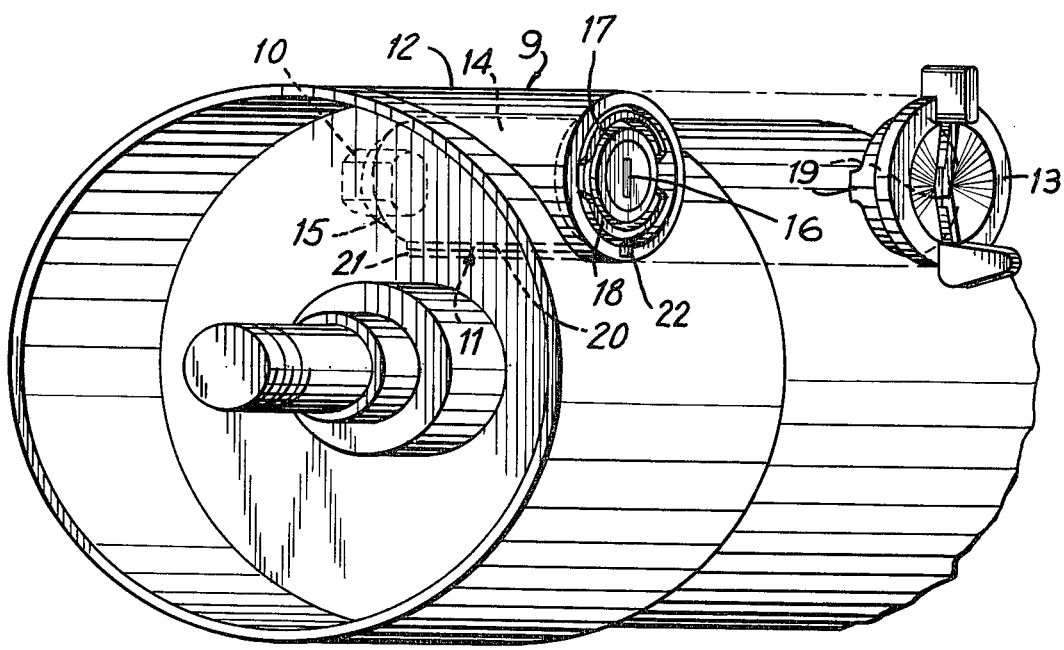
FIG. 2 is a perspective view of the lock and steering column of FIG. 1 with the ignition cylinder cap removed to expose a flange of a lock cylinder of the type used in 1977 model year G.M. automobiles.

FIG. 2 shows the locking arrangement of FIG. 1 with the cylinder cap 13 removed. The particular lock shown in FIG. 2 is of the type used on 1977 model year G.M automobiles. It will be seen that the cap 13 is affixed to the outer flange or shoulder 18 of the cylinder plug by means of tabs 19 which lodge against corresponding edge cut portions along the outside of the shoulder 18. The cap 13 is press-fitted over the shoulder 18 and may be knocked off of the lock by means of a blow with a suitable tool. When the cylinder cap 13 is fitted over the shoulder 18, a properly coded key inserted through the opening of the cap and into the keyway 16 will unlock the locking mechanism and enable the plug of the cylinder 11 to rotate within the shell 14 to turn the connecting member 10. The outer shell 14 is restrained from rotation within the housing 12 by means of a ridge 20 formed along the outer portion of the outside shell which engages with a groove 21 extending along the inside wall of the housing 12. A ring clip 22 surrounds the neck of the shoulder 18 and has an integrally formed hook extending out from its edge and into the ridge 20. As may be more clearly seen in FIG. 5, the hook from the clip 22 also fits within the groove 21, thereby further restraining rotational movement of the shell 14 of the lock cylinder 11.

In the steering wheel lock arrangement shown in FIG. 2, it is seen that a minimal clearance exists between the outside edge of the cylinder plug flange 18 and the inside wall of the housing 12 which surrounds the head portion 17 of the rotatable plug. It is therefore apparent that the overall diameter of that portion of the cap 13 which extends into the housing 12 and is press-fitted onto the shoulder 18 may not exceed the inner diameter of the outside opening of the housing 12, so that both the cap 13 and the plug of the cylinder lock will freely rotate when the proper key is inserted into the keyway 16.

The entire lock cylinder assembly 11 is retained within the housing 12 by a retaining pin which will be described later. One method of withdrawing the lock cylinder from the housing 12 is to dismantle the steering column and, using a suitable tool, gain access to the retaining pin so that it can be depressed while an outward pulling force on the shoulder 18 acts to withdraw the cylinder from the housing. As noted above, this practice is time consuming and expensive.

A lock cylinder 11 of the type illustrated in FIG. 2 may be easily withdrawn by using the present inventive tool as shown in FIG. 3.

The tool 30 includes a cylindrical inner member 32 having a groove 34 cut circumferentially in one end thereof. The inner member 32 is preferably made of case hardened C 1018 steel. Of course, any other material having equivalent tensile strength and hardness may be employed. The diameter of the inner member 32 over the region extending from the groove 34 toward the other end of the member 32 is substantially equal to that of the plug flange 18 of the lock cylinder 11 in FIG. 2. Threaded into the rear portion of the inner member 32 is a rod 44. A hollow outer shell 40 has an axial bore 42 extending therethrough to its rear wall 43. The outer shell 40 may also be made of steel, but it has been found that aluminum can be used and is, in fact, preferred. The diameter of the bore 42 is slightly greater than the overall diameter of the inner member 32 and an opening is provided in the rear wall 43 to permit the threaded rod 44 to pass therethrough when the inner member 32 freely slides within the bore 42. Cut out along the edge of the shell 40 is a slot 41 which is shaped to freely accommodate the hook formed on the edge of the ring clip 22, the clip 22 surrounding the neck portion 47 of the lock plug as shown in FIG. 5. It is noted that it is not always necessary to provide the slot 41, in that the aforesaid hook may not in all cases be caused to move within the shell 40 when the tool 30 is operated as explained later.

Washers 46, 48 and a threaded nut 50 engage the threaded rod 44 and act to draw the cylindrical inner member 32 within the bore 42 of the shell 40 when the nut 50 is tightened against the outside of the rear wall 43 of the outer shell.

Still referring to FIG. 3, shown generally by numeral 25 is an elongated hook member having hooks 28 formed at each of its ends. A hook member 25 is also shown in FIG. 4. The body 26 of the hook member 25 is of a thickness no greater than the radial clearance between the inner member 32 and the inside wall of the shell 40, so that when a number of hook members 25 are placed along the surface of the inner member 32 in an axial direction, each with one of their hooked ends 28 engaging the groove 34, the tool inner member 32 and the hook members 25 placed thereon may be slideably drawn within the bore 42 of the shell 40.

It has been found that a suitable material from which each of the hook members 25 can be formed is SAE 1075 spring steel, flat round edge wire having a preferred thickness of about 0.020 inches (0.51 mm) and a width of about 0.125 inches (3.18 mm). It will, of course, be apparent to a skilled worker in the art that other materials having equivalent tensile strength and stiffness may as well be used. The tool inner mmeber 32 also has a cylindrical forward portion 36 having a reduced overall diameter, the portion 36 having a groove 38 circumferentially cut therein. The purpose of this forward portion 36 will be explained later in regard to FIGS. 9, 10 and 11.

Turning now to FIG. 5, the steering wheel lock assembly of FIG. 2 is shown in greater detail, and the hook members 25 described above are shown engaged underneath the flange 18 of the plug of the cylinder 11. It is seen that the preferred thickness of the hook members 25 is sufficiently small to allow placement of each of them through the narrow clearance between the edge of the flange 18 and the inside wall of the housing 12.

Figure 6:
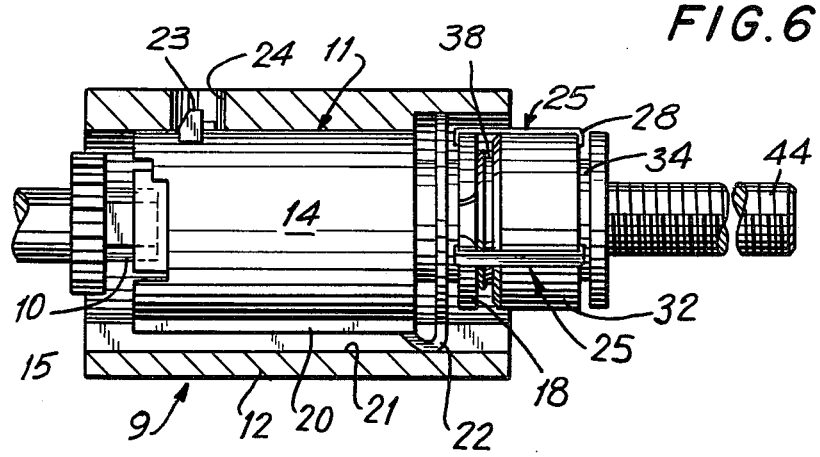
FIG. 6 is a side view, partly in section, of the lock cylinder arranged as in FIG. 5 and joined with the inner member of the inventive tool by the coupling means of FIG. 4.
Figure 7:
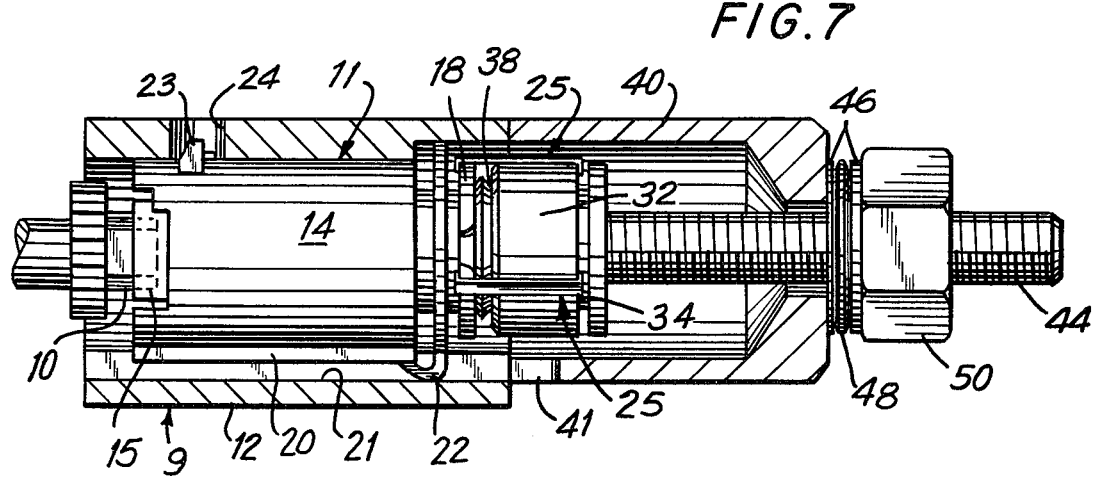
FIG. 7 shows the tool of the present invention in operative relationship with the cylinder lock of FIG. 6.
Figure 8:
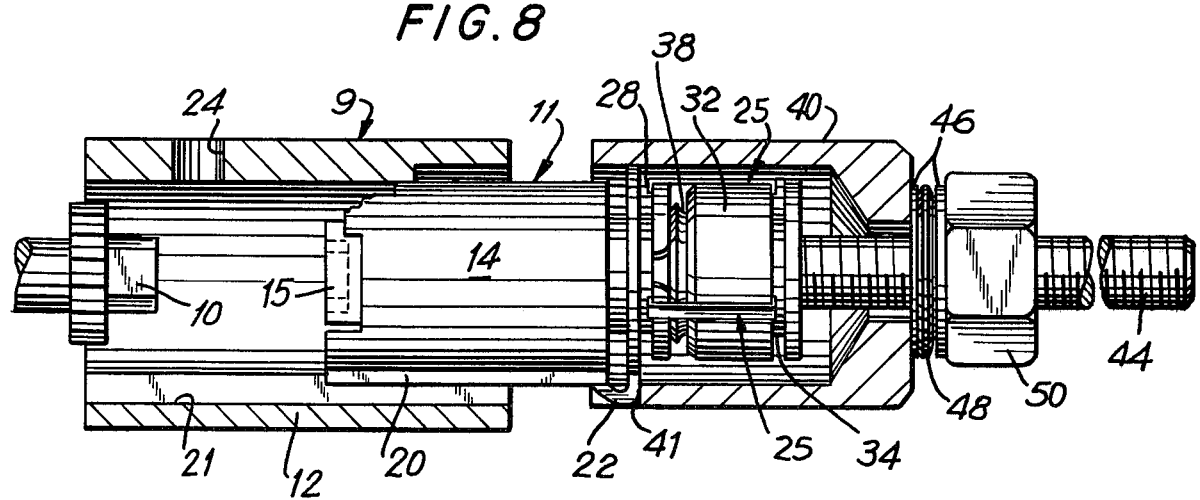
FIG. 8 shows the lock cylinder being removed from its housing after operating the tool as positioned in FIG. 7.

The tool shown in FIG. 3 is used to extract the cylinder 11 shown in FIG. 5 by first inserting a number of hook members 25 through the aforementioned clearance within the lock housing 12 so that one of the hooked ends 28 is positioned beneath the underside of the flange 18. It has been found that as few as 8 hook members 25, symmetrically disposed about the flange 18 will suffice to transmit sufficient pulling force to the cylinder 11 provided the hook members 25 are formed from the preferred material described above. However, it is suggested that as many as 12 hook members 25 be disposed about the flange 18 in order to ensure that the tool 30 will operate successfully. After the hook members 25 have been positioned as shown in FIG. 5, the inner cylindrical member 32 of the tool 30 is placed with its forward portion facing the cylinder flange 18. The outwardly extending hook members 25 may easily be spread out (e.g., pivoted outwardly), to allow the tool inner member 32 to be so placed. The free ends of the hook members 25 are then pivoted inwardly toward the surface of the inner member 32 so that their hooked ends 28 fall into and engage the groove 34, as shown in FIG. 6. Next, in FIG. 7, the outer sheel 40 is placed over the tool inner member 32 having the hook members 25 lying thereon, with the threaded rod 44 extending out from the rear wall of the shell 40. The shell 40 is brought into abutting relationship with the housing 12, the slot 41 in the shell 40 being aligned with the hook which extends from the edge of the ring 22. As indicated hereinabove, it has been found that in some instances the provision of the slot 41 is not necessary so that the shell 40 need not be so aligned with respect to said hook if the slot 41 is provided therein. Thus nut 50 is then tightened by hand until the entire tool is firmly held in place against the lock housing 12. When the nut 50 is further tightened by means of a wrench, for example, an outwardly directed force is applied to the lock cylinder 11 through the threaded rod 44, the tool inner member 32, each of the hook members 25, and the lock plug flange 18. During this time, the hook members 25 are restrained from radial movement by way of the close clearance between the inner member 32 and the inside wall of the shell 40. The outward force exerted on the cylinder 11 through hook members 25 causes the retaining pin 23, shown in FIGS. 6 and 7, to break away a portion of the outer cylinder shell 14 which lies directly behind the pin 23. When this happens, the pin falls down and out from the housing opening at 24 to permit the lock cylinder assembly 11 to be freely withdrawn out from the housing 12 as shown in FIG. 8. After the cylinder 11 is removed, the portion of the outer shell 14 which as been cracked away may be withdrawn from the housing cavity, and a new lock cylinder with a cap 13 already attached may be inserted and latched within the cavity.

Figure 9:
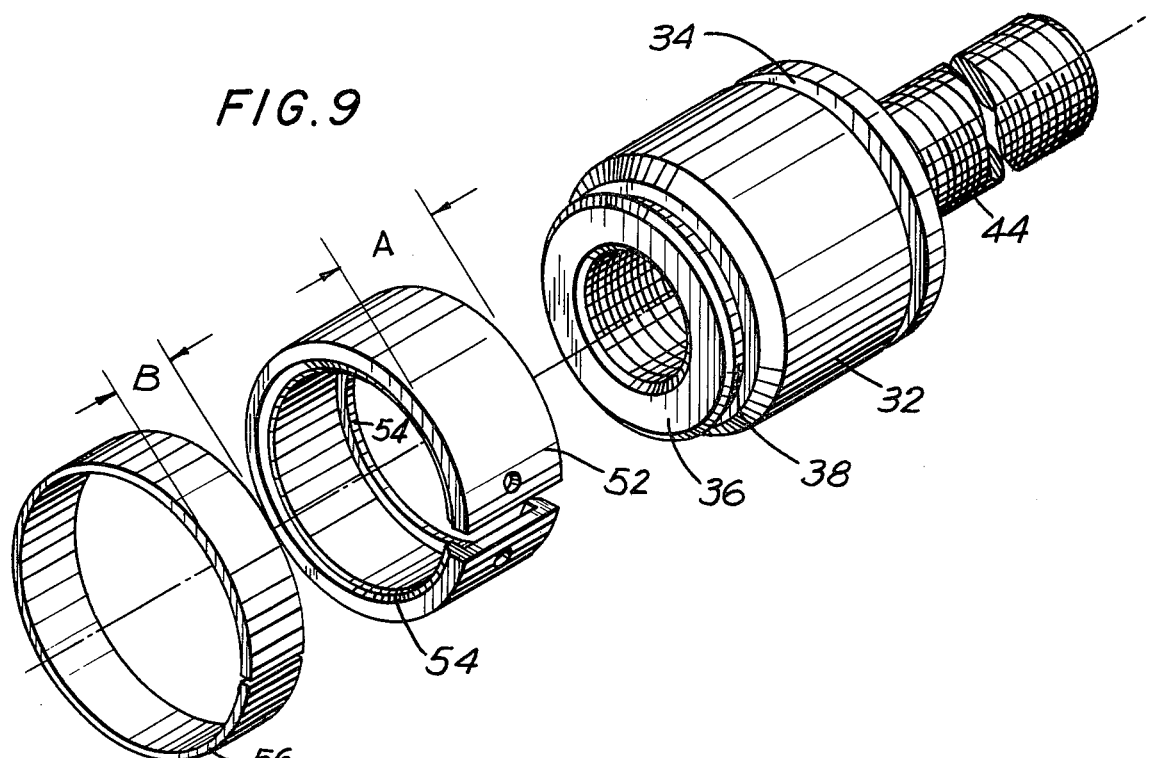
FIG. 9 shows the inner member of the inventive tool and coupling means suitable for engaging the inner member with the flange of the lock cylinder of the type used in pre-1977 model year G.M cars.

Shown in FIG. 9 is the cylindrical inner member 32 of the tool having a forward cylindrical portion 36 with a groove 38 cut therearound. The overall diameter of the forward portion 36 is less than that of the portion of the member 32 immediately forward of the groove 34. The diameter of the portion 36 is substantially equal to the diameter of the plug flange 18' of the older type (i.e., pre-1977) of G.M. steering wheel lock assembly shown in FIG. 10. Still referring to FIG. 9, a split ring collar 52 is shown having a width A and circumferential inwardly directed annular lips 54 formed at each of its ends. The collar member 52 is preferably made from cold drawn C 1045 seamless stell tubing but, of course, can be made from other materials having equivalent tensile strength, resiliency and hardness. The lips 54 are dimensioned to engage the groove 38 on the inner member 32 of the tool 30 and the underside of the flange 18' of the plug of the lock cylinder 11, respectively. Also shown is a split ring collar 56 having a width B preferably slightly greater than one-half of the dimension A. The inner diameter of the collar 56 is substantially equal to the outer diameter of the collar 52 so that when the collar 56 is expanded and placed over collar 52, a tight sliding fit exists between the two collars 52 and 56. The collar 56 can be made of cold rolled steel. However, any other material having equivalent resilient characteristics when so formed can be used since no tensile force is transmitted through the collar 56 when the tool 30 is operated therewith.

Figure 10:
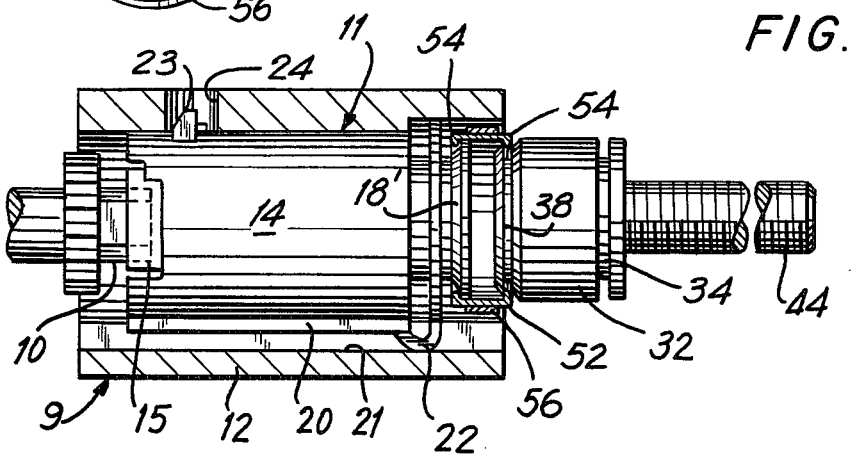
FIG. 10 shows the inner member of the present tool operatively engaged with the older type lock cylinder by way of the coupling means shown in FIG. 9.
Figure 11:
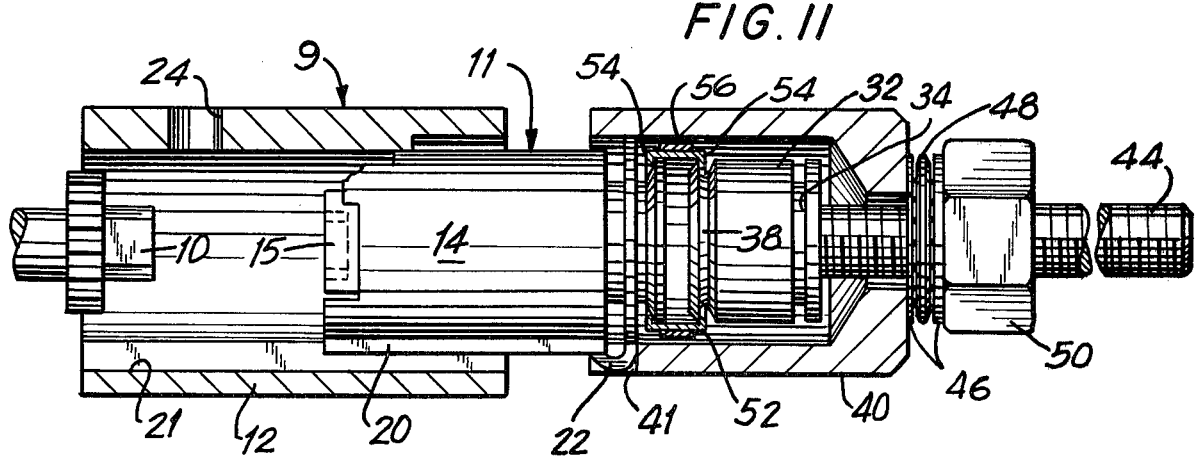
FIG. 11 shows the older type lock cylinder being withdrawn from its housing after operating the tool of the present invention.

FIG. 10 shows the inner cylindrical member 32 of the tool 30 joined with the lock cylinder 11 by way of the collars 52 and 56. The collar 52 is first inserted through the opening in the housing 12 after the cylinder cap has been removed, and then forcibly pressed against the flange 18', until it expands to allow its annular lip 54 to snap over and engage the flange 18' along its inwardly tapered neck portion. The thickness of the collar 52 is such that sufficient clearance exists between the outer edge of the flange 18' and the inner wall of the housing 12 to permit the collar 52 to be expanded and pressed over the flange 18' until the annular lip 54 is seated on the neck of the flange 18', as just explained. The collar 52 closes tightly to firmly engage the flange 18' and the other collar 56 is then placed over the collar 52. It will be understood that the outer diameter of the collar 56, after it has been expanded to fit about the collar 52, is such that it may still slide toward the flange 18' within the recess of the housing 12. With the collar 56 positioned at the end of the collar 52 closest to the flange 18', the forward portion 36 of the tool inner member 32 is forcibly pressed into the remaining open side of the collar 52 until an annular lip 54 engages the groove 38 in the forward portion 36. As shown in FIG. 7, the outer shell 40 of the tool 30 is placed over the threaded rod 44 and the inner member 32 until the shell 40 abuts against the outside edge of the housing 12. Also, as shown in FIG. 7, the slot 41 on the shell 40 is positioned to accept the hook extending from the ring 22 when the cylinder 11 is withdrawn, unless such positioning is not required as explained above. It will also be appreciated that the collars 52 and 56 are restrained from radially expanding when the inner member 32 is drawn outwardly by means of the threaded rod 44 and nut 50, because a sufficiently narrow clearance exists between the outside of the collar 56 when placed over the collar 52, and the inside wall of the bore in the shell 40. This condition is illustrated in FIG. 11 where the lock cylinder assembly 11 is shown being withdrawn from the housing 12 similarly to the withdrawn lock shown in FIG. 8. The lock of FIG. 11 may also be replaced with a new unit after it has been withdrawn and after any remaining pieces thereof are removed from the housing cavity.

While the present invention has been shown and described with respect to specific embodiments thereof, other modifications and variations of these embodiments, all within the intended spirit and scope of the present invention, will be apparent to those skilled in the art. It is therefore intended that the appended claims be held to cover all such equivalent variations and modifications.

What is claimed and desired to be secured by Letters Patent is:

1. A tool for removing a lock cylinder from a lock housing, the cylinder being of the type having a shell with a plug rotatably mounted therein, said plug having a circular flange projecting out from the forward end of said shell, said tool comprising:

a cylindrical inner member having a circumferential groove cut thereon, the overall diameter of said inner member throughout a region extending from said groove to one end of said inner member being substantially equal to the overall diameter of said flange;

a hollow outer shell having an axial bore extending from one end thereof, said hollow outer shell having a wall at its other end provided with an opening therein, the diameter of the bore being a predetermined amount greater than the overall diameter of said inner member;

a plurality of elongated hook members, each having a hook formed at one end of the body thereof shaped to engage the groove on said cylindrical inner member, and a hook formed at the other end of the body thereof shaped to engage the underside of said flange; and means for drawing said cylindrical inner member into the bore of said outer shell toward the other end of said outer shell, said drawing means extending out through the opening in the other end of said outer shell in operative engagement therewith and being connected to the other end of said inner member, whereby when a predetermined number of said hook members engage both the groove and the underside of said flange and said drawing means is operated, said inner member transmits an outwardly directed force to said lock cylinder through said hook members and said flange to withdraw the cylinder from the lock housing when said outer shell is maintained stationary with respect to the housing.

2. A tool according to claim 1, wherein said drawing means comprises a threaded rod fixed to the other end of said cylindrical inner member, and a nut arranged to threadingly engage said threaded rod and to operatively bear on the other end of said outer shell to exert a tensile force on the rod when the nut is tightened.

3. A tool for removing a lock cylinder from a lock housing, the cylinder being of the type having a sheel with a plug rotatably mounted therein, said plug having a circular flange projecting out from the forward end of said shell, said tool comprising:

a cylindrical inner member having a forward longitudinal portion and a rearward longitudinal portion, the overall diameter of said forward portion being less than that of said rearward portion and substantially equal to the overall diameter of said flange, said forward portion having a circumferential groove cut thereon;

a hollow outer shell having an axial bore extending from one end thereof, said outer shell having a wall at its other end provided with an opening therein, the diameter of said bore being a predetermined amount greater than the overall diameter of the rearward portion of said cylindrical inner member;

cylindrical coupling means for joining the forward portion of said inner membeer to said flange, said coupling means being formed with means at its ends for engaging the circumferential groove on said forward portion and the underside of said flange, respectively; and means for drawing said cylindrical inner member into the bore of said outer shell toward the other end of said outer shell, said drawing means extending out through said opening in the other end in operative engagement therewith and being connected to the end of the rearward portion of said inner member, whereby when said coupling means engages both the groove and the underside of said flange and said drawing means is operated, said inner member transmits an outwardly directed force onto said lock cylinder through said coupling means and said flange to withdraw the cylinder from the housing when said outer shell is maintained stationary with respect to the housing.

4. A tool according to claim 3, wherein said drawing means comprises a threaded rod fixed to the end of the rearward portion of said cylindrical inner member, and a nut arranged to threadingly engage said threaded rod and to operatively bear on the other end of said outer shell to exert a tensile force on the rod when the nut is tightened.

5. A tool according to claim 3, wherein said coupling means comprises first and second resilient split collars, said second collar having a width less than that of said first collar and having an unexpanded inner diameter substantially equal to the outer diameter of said first collar, and said engaging means comprises an inwardly extending annular lip at each end of the first collar, said annular lips being formed to engage the groove and the underside of the flange, respectively, when the second collar is placed in circumscribed relationship to the first collar.

6. A tool for removing a lock cylinder from a lock housing, the cylinder being of the type having a shell with a plug rotatably mounted therein, said plug having a circular flange projecting out from the forward end of the shell, said tool comprising:

a cylindrical inner member having forward and rearward longitudinal portions, said forward portion having an overall diameter less than that of said rearward portion, said forward and rearward portions having first and second circumferential grooves cut thereon, respectively, the overall diameter of said flange being substantially equal to one of the overall diameters of said forward and rearward portions;

a hollow outer shell having an axial bore extending from one end thereof, said outer shell having a wall at its other end provided with an opening therein, the diameter of the bore being a predetermined amount greater than the overall diameter of said rearward portion;

coupling means for joining said inner member to said flange, said coupling means being formed with means at its ends for engaging one of the first and second circumferential grooves on said cylindrical inner member and the underside of said flange, respectively; and means for drawing said cylindrical inner member into the bore of said outer shell toward the other end of said outer shell, said drawing means extending out through said opening in the other end of said outer shell in operative engagement therewith and being connected to the end of the rearward portion of said inner member, whereby when said coupling means engages a selected one of the first and second grooves and the underside of said flange, and said drawing means is operated, said inner member transmits an outwardly directed force onto the lock cylinder through said coupling means and said flange to withdraw the cylinder from the housing when said outer shell is maintained stationary with respect to the housing.

7. A tool according to claim 6, wherein said drawing means comprises a threaded rod fixed to the end of the rearward portion of said cylindrical inner member, and a nut arranged to threadingly engage said threaded rod and to operatively bear on the other end of said outer shell to exert a tensile force on the rod when the nut is tightened.

8. A tool according to claim 6, wherein said coupling means comprises first and second resilient split collars, said second collar having a width less than that of said first collar and having an unexpanded inner diameter substantially equal to the outer diameter of said first collar, and said engaging means comprising an inwardly extending annular lip at each end of the first collar, said annular lips being formed to engage the first circumferential groove on said inner member and the underside of said flange, respectively, when the second collar is placed in circumscribed relationship to the first collar.

9. A tool according to claim 6, wherein said coupling means comprises a plurality of elongated hook members, each having a hook formed at one end of the body thereof shaped to engage the second circumferential groove on said cylindrical inner member and a hook formed at the other end of the body thereof shaped to engage the underside of said flange.

* * * * *